Dec. 19, 1961 I. J. AMAZON 3,013,303
DEGATING DEVICE FOR PLASTIC MOULDS
Filed March 15, 1960 2 Sheets-Sheet 1
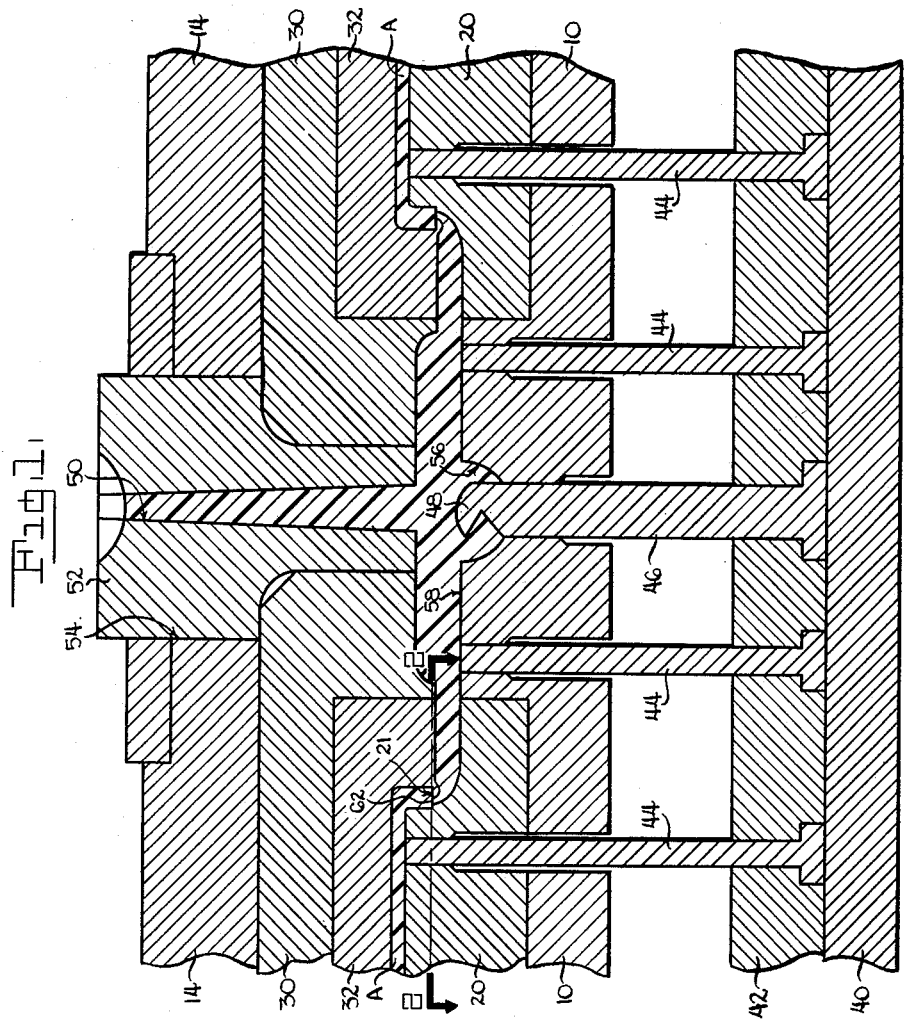
INVENTOR.
IRVING J. AMAZON
BY Kenwood Ross
ATTORNEY Dec. 19, 1961     I. J. AMAZON     3,013,303
DEGATING DEVICE FOR PLASTIC MOULDS
Filed March 15, 1960     2 Sheets-Sheet 2
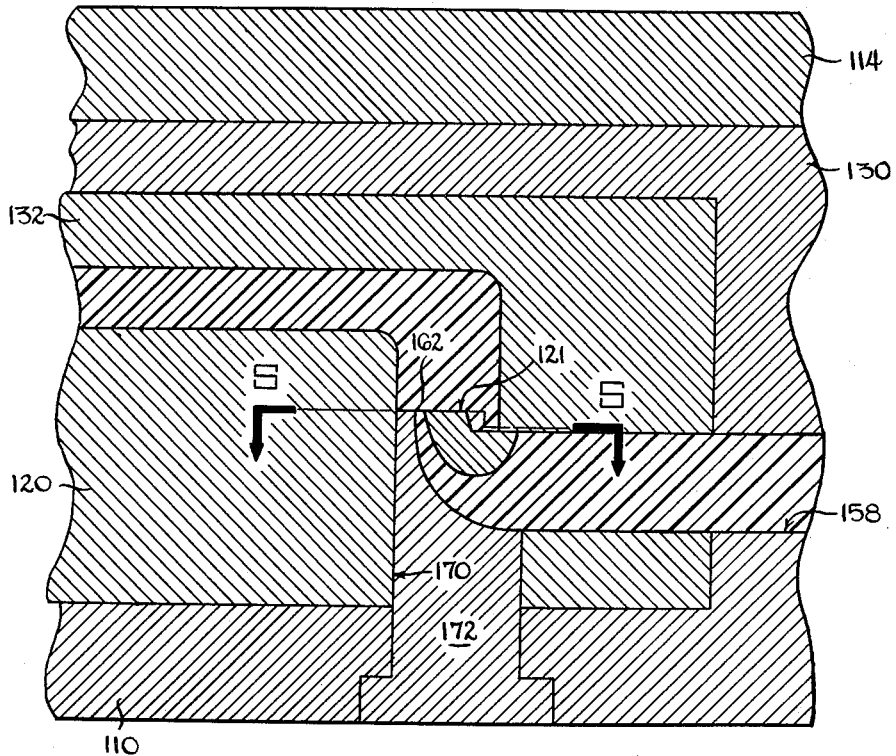
Fig. 4.
Fig. 5.
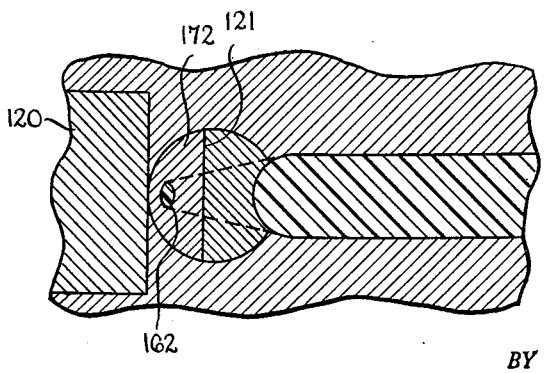
INVENTOR.
IRVING J. AMAZON
BY *Kenwood Ross*
ATTORNEY

United States Patent Office 3,013,303
Patented Dec. 19, 1961

3,013,303
DEGATING DEVICE FOR PLASTIC MOULDS
Irving J. Amazon, 56 Velma Ave., Pittsfield, Mass.
Filed Mar. 15, 1960, Ser. No. 15,096
5 Claims. (Cl. 18—42)

The present invention relates to new and useful improvements in structural refinements in mould apparatus, such as injection moulding machines, for the production of articles of molded material. It is directed more particularly to the provision of improvements in a degating means and in a method for accomplishing the separation of the gates from the moulded articles.

In the known processes of manufacture of articles of the kind in question, the disadvantage arises that, after opening the mould, each formed article of the plurality thereof remains connected with the material which is solidified in the gates and runner and sprue channels in the mould, so that all of the formed articles made in the course of a single moulding operation are connected together. It is necessary, accordingly, to detach these formed articles from this interconnecting medium, namely the gates and runners and sprue. Same has heretofore involved a supplementary slow and tedious operation of careful finishing, same being costly especially in the case of articles of small individual monetary value.

Herein, a comparatively simple and extremely efficient means of separating the gates and runners and sprue from the moulded articles is provided so that the latter may be ejected free of the gates and the mould components quickly made ready for the next operation without the necessity of separately cutting the gates and consequent necessary finishing and/or polishing. Further, a simple means of ejecting the sprues and runners is provided.

In apparatus of the type envisioned, the injection moulding mechanism in which the moulds are mounted usually includes a stationary platen and a movable platen, said platens comprising partible sections and being closed in registering relationship to permit the plastic material to be injected into the moulds formed by the closure of the platens. The resin, while in the heated formative state, is usually advanced under pressure through communicating sprue channels and runner channels branching off therefrom and then through gates terminating in the spaced mouldig cavities of the mould in which the articles are formed. After the plastic material is injected into the respective moulding cavities and has set, the movable platen is moved away from the stationary platen and the knockout pins, carried by a knockout plate and mounted adjacent the stationary platen, are moved against the moulded pieces so as to eject them from their respective cavities.

The formation of substantially finished moulded objects by such process has been impossible with existing machines and processes since injection moulding requires gating into the mould cavity with the result that the attached gate and formed article have had to be removed from the mould as a unit. Subsequent separation of the gate and formed article has thus been required so as to add expense to the finished product in view of the separate step required to produce the finished object. Furthermore, this separation has frequently been accomplished by a process which produce a marred or disfigured portion on or a superfluous projection extending from the surface of the article at the point of with the gate thereof. If such marred or disfigured surface portion is unacceptable in the finished product, a still further finishing operation may be necessary to obliterate such portion.

As used hereinafter and in the appended claims, the term "gate opening" refers to the terminal end of the runner channel which leads to and communicates with the mould cavity of the moulding die. The term "gate" refers to the set moulding material disposed in the gate opening of the plates of the moulding die following each injection of the molten material. The term "runner channel" refers to the channel which connects the gate opening and the sprue opening in the plates of the moulding die. The term "set" refers to the hardening of the material from the molten state to that condition wherein it will substantially retain its molded shape without external support. The term "runner" refers to the set moulding material disposed in the runner channel connecting the gate opening and the sprue following each injection. The term "sprue" refers to the set moulding material disposed in the sprue opening following each injection.

The process and moulding die construction comprising the invention lend themselves particularly well to the moulding of various objects having critical and non-critical portions. It is particularly applicable to ornamental, functional and structural objects, especially of the type where at least one portion of the surfaces of said objects is not readily seen in customary use thereof, whereby a cavity, opening, or sheared surface formed as a result of the separation of the gate from the formed object or article will not mar or detract from the appearance of the molded object.

As used hereinafter therefore, the term "critical surface" or "critical portion" refers to any surface or portion on a molded object which so cooperates with another coengageable object or member such that such surface or portion must have a finished moulded surface into which it will be highly undesirable to gate the molten material during the moulding process. Similarly, the term "non-critical surface" or "non-critical portion" refers to any surface portion which does not cooperate with or coengage another object or member whereby gating into such surface or portion will not produce particularly objectionable results when using the molded object.

The invention is particularly adaptable to the moulding by injection means of synthetic resinous material to form finished objects, but the principles illustrated and described herein are useful for moulding objects from other kinds of fusible material, such as various types of readily fusible metal.

The moulding die construction shown herein contains only a pair of single mould cavities, but of course, such is for purposes of simplicity and clarity only. It will be understood that the principles of the invention are applicable to multi-cavity as well as single cavity dies.

One of the fundamental aspects of the invention comprises separating, in the process of their removal from the moulding die, the gate and runner and sprue from the moulded object at the juncture of the gate and object. Such separation takes place preferably immediately after the fusible material has set within the mould cavity, the gate opening, the runner channel and the sprue opening.

This invention resides in the particular construction, arrangement, combination, and relationship of the various elements, components and instrumentalities of a moulding apparatus, as exemplified in the detailed disclosure hereinafter set forth and wherein the objects of the invention, as defined, will be apparent.

It is another object of the present invention to provide an inventively novel and improved construction of the type in which the moulded parts may be more easily separated from their related gates and runners and sprues following the moulding operation by means of a degating device contained wholly within the mould itself and operable upon the opening of the mould in manner to separate the gate and runner and sprue from the formed moulded article so that the latter is removed in final moulded form with no further trimming operation being necessary.

Another object includes the provision of a method for automatically removing gates and runners and sprues from moulded articles upon the opening of the dies and the ejection of the formed articles therefrom in manner whereby no finishing operations whatsoever are necessary and the formed articles may be taken directly from the moulds without the necessity for any trimming and/or polishing of the gate marks.

More specifically, the runner channels hereof are designed for the passage of the moulding material therethrough to the moulding cavities through a gate opening of reduced diameter as compared with the thickness of the formed article and/or the diameter of the runner channel so that upon ejection of the formed article and the gate and runner and sprue, said gate and runner and sprue is moved with respect to the formed article so as to forcibly separate the gate from the formed article. Stated otherwise, I provide a gate opening nozzle embodying such a restricted orifice that the portion of the gate next adjacent the article moulding cavity is in the form of a portion of exceedingly reduced thickness which is easily separable from the formed article.

A further object of the present invention is to provide a sectional mould apparatus of the pressure-ejection type in which improved means are provided comprising restricted ports or passages through which the heated synthetic resins are delivered under pressure to the regions of the moulding cavities of the apparatus so that the plastic articles formed therein will be devoid of gates or runners or sprues or other protrusions or extensions when removed from the mould.

It is another salient object hereof to provide a degating device as above stated which is simple in construction and positive in operation and incorporates a means which is automatically operable upon an opening of the mould following the moulding operation so that the gate and article may be separated and ejected separately as a part of the opening cycle of the moulding machine.

It is another object to produce a moulding die construction capable of achieving an injection moulding process by which completely finished moulded objects and articles may be automatically produced as a result of the moulding operation and without requiring subsequent severance or separation of gates and runners from the moulded articles, the gates entering the mold cavities of the die through surfaces of the article-forming cavities which will form non-critical surfaces on the moulded objects as distinguished from critical surfaces. Hereby, the critical surfaces especially will have the usual required finished moulded surfaces normally produced by a moulding die, and the separation of the moulded gate from a non-critical surface portion of a moulded object will not affect any critical surface of the moulded object all as distinguished from prior art practices wherein gates are generally connected to moulded obejcts at portions of the surfaces of the objects which are critical.

The present invention has for another object to provide a mould permitting of avoiding the aforementioned disadvantages of the prior art by positioning the outlet of the channel for injecting the moulding material into the article forming cavity at the bottom of a depression provided on the latter. By reason of this particular arrangement, when the material is broken at the point of attachment of the formed article to the gate, the fracture is produced at the exact center of the point of jointure.

The present invention has additionally for its objects to provide a mould more especially intended for carrying out the above defined method, the mould being characterized mainly in that the separation of the mould is carried out by the simultaneous removal of the set material filling the cavities and channels and the removal of the formed articles in manner so as to produce the breakage of the connection between the former and the latter.

The details of these objects and the invention, as well as other objects thereof, are set forth in the following specification and illustrated in the accompanying drawings forming a part thereof.

In the drawings, a moulding die construction is illustrated in an exemplary manner without showing many of the details of the injection moulding machine which operates the various parts of the mould per se. It is not believed necessary to burden the illustrations with such details since the machine with which the moulding die hereof is used is of substantially standard construction in many types of machines now in use.

In the preferred embodiment of the invention, the moulding die comprising the invention is mounted within an injection moulding machine having mould-operating members movable in a substantially vertical direction. However, it is readily conceivable that substantially all aspects of the moulding die and process comprising the present invention are useful in moulding machines and die constructions including operating members movable in a substantially horizontal direction or in directions other than vertical.

Inasmuch as the mechanism for injecting the plastic material into the moulds and the balance of the moulding machines forms no part of the present invention, only the apparatus involving the moulds per se, is shown in the drawings and described in connection with my invention.

In the drawings:

FIG. 1 is a vertical longitudinal sectional view taken through the separable mould sections of the apparatus and disclosing same in their joined moulding positions;

FIG. 2 is a sectional view on the line 2—2 of FIG. 1;

FIG. 3 is an inverted plan view of one end portion of an article formed in the moulds shown in FIGS. 1 and 2;

FIG. 4 is an enlarged vertical longitudinal sectional view, similar to FIG. 1, showing a modified form of the apparatus; and FIG. 5 is a sectional view on the line 5—5 of FIG. 4.

It will be understood that the complete injection moulding machine is adapted for moulding articles of any desired configuration from plastic material, such as thermosetting or thermoplastic synthetic resins. As usual, the latter may be supplied to the machine by way of a hopper or magazine in granular form and fed in measured quantities into a heating cylinder which contains a reciprocatory ram or other equivalent pressure device. In the cylinder, the resins are subjected to heating in a pressure chamber and thereby converted from their normally solid to a favorable plastic plate adapted for pressure injection into mould activities as in producing formed articles. The pressure thereon is exerted by a fluid-actuated slidable ram. At its forward end, the chamber terminates in a restricted outlet, which outlet is disposed in registry with an axial passage present in a sprue bushing subsequently to be described.

Referring first to FIG. 1, I provide in accordance with my invention a mould having a lower stationary platen or support 10 and an upper oppositely disposed slidably movable platen or clamp plate 14, the latter being actuated by a fluid pressure responsive ram, not shown, for axial vertical movement toward and away from the stationary platen. That is, the platens are separable one from the other and are also disposed in parallel relationship as to each other.

Said platen assembly is placed within a conventional injection moulding press and preferably one in which the injection nozzle, as well as the ram or plunger operating the lower platen 10 move in a vertical direction, although it is to be understood that the die construction may as readily be employed in a press in which said nozzle and ram move in a horizontal direction. A sectional mould structure is carried by and arranged between these platens 10 and 14 in axial vertical alignment therewith. It is particularly to the design of this mould structure that the present invention is directed.

The lower platen or support 10 supports upwardly thereof a plurality of force sections 20. In the use of the mold, these members are firmly clamped together so that the same constitute, in effect, a unitary construction though it will be understood that they may be separated along their parting surfaces. Such separation permits of the removal of given force sections from the associated stationary platen so that other force sections may be substituted for the first force sections, enabling articles of different configurations to be moulded, all without changing the stationary platen.

The movable platen 14 supports downwardly thereof a retainer plate 30 which supports downwardly thereof a plurality of cavity sections 32. In the use of the mould, these component parts are firmly clamped together so that the same constitute, in effect, a unitary construction. However the various components can be separated along their parting surfaces. Such separation permits of the removal of a given cavity section, or plurality thereof, from an associated retainer plate 30 so that other cavity sections may be substituted for the first cavity sections, enabling articles of different configurations to be moulded, all without changing the retainer plate 30.

Disposed below said stationary platen 10 in spaced relation therewith is a movable knockout or ejector plate 40 which carries upwardly thereof and therewith an ejector retainer 42 to which are fixedly positioned in predetermined relationship to retainer plate 10 and force sections 20 a plurality of vertically extending ejector or knockout pins 44 which register with suitable openings in the stationary platen 10 and in certain instances one of the forces 20. In the drawings, these have merely been fragmentarily illustrated to simplify the illustration and they may be secured to the press in any suitable manner.

Said pins 44 are movable therein when the knockout or ejector plate 40 is operated to eject the moulded articles and the sprues as will be observed.

One of the ejector pins 46 may function as a sprue puller, it being provided at its uppermost extremity with a hook means 48 for purposes to be described.

As aforestated, the forward end of the heating chamber of the conventional injection moulding apparatus (not shown) terminates in a restricted outlet, which outlet is disposed through intermediate means such as a nozzle in registry with an axial passage or sprue opening 50 present in a sprue bushing 52, the latter being removably positioned in a socket or opening 54 provided in the clamp plate 14 of the mould.

The axial passage 50 may be enlarged at its lower extremity to provide a larger diametered portion of the passageway thereat leading directly into the main runner or sprue channel designated as 56.

Extending outwardly from and usually transverse to the main runner or sprue channel 56, a plurality of runner channels or side runner channels 58 are provided.

The outer end portions 60 of the runner channels 58, that is the end portions farthest away from the main runner or sprue channel, are curved so as to extend vertically upwardly and tapering inwardly to form a gate opening 62.

That is the gate opening is provided with an inclined interior bore which gradually converges upwardly. This bore is a passage for the moulding material and terminates in an annular shoulder formed by a thin wall section 21 of the force section 20 which overlies the said gate, the shoulder being so shaped as to form a small pin-like vertically-extending passageway leading through the said thin wall section 21 directly into the article moulding cavity.

The apparatus is so designed that the length of the narrow pin-like passageway or gate opening provides an easily separable sprue due to the fact that as the formed article is pushed upwardly by its respective ejector pin on one side of the passageway and as the gate and runner and sprue are pushed upwardly by their respective ejector pins on the other side of the passageway, the narrow pin like gate set within the opening is held in situ so that the aforementioned formed article and gate and runner are rotated relative thereto. Accordingly, a twisting or angularizing action ensues which effects the desired separation of the formed article and the related gate and runner and sprue.

In the operation of the die, the same is of course closed for the injection, the movable platen being brought into mating relationship with the stationary platen for the formation of the sprue and runner channels through which the heated plastic material is forced under ram-developed pressures.

As aforedescribed, these passages normally diverge from a common pressure chamber outlet in a manner forming a multiplicity of individual passages, each of which leads to an end of an article-moulding cavity.

During a moulding operation, the adjacent mould faces of the stationary and movable platen assemblies are held tightly against one another as by jaws (not shown) of the injection moulding machine so that the opposed faces accurately and rightly contact with each other and are held in fixed position as to each other to prevent the escape of moulding material therebetween.

After a given moulding operation, in which the heated plastic material forced into each cavity is allowed to set, cure or harden to produce the articles of predetermined definite shapes, the die is opened by mechanism which may be conventional and forms no part of the invention. The molding sections are separated to provide for the withdrawal of the moulded articles from the cavities of the cavity section and their removal as formed products from the apparatus.

The articles being moulded are indicated at A as in FIGS. 1 and 3. It is to be noted that this case is illustrated as applied to handles but of course it is contemplated that the invention is not restricted to such articles, the handles being shown by way of illustration and also because the present invention embodies features which are particularly adapted to handles.

In the modified form of the invention shown in FIGS. 4 and 5, I have shown a mould having a lower stationary platen or support 110 and an upper oppositely disposed slidably movable platen 114 the latter being actuated by a fluid pressure responsive ram, not shown, for axial vertical movement toward and away from the stationary platen.

The stationary platen 110 supports upwardly thereof one or more force sections 120. In the use of the mould, these members are firmly clamped together so that the same constitute, in effect, a unitary construction though it will be understood that they may be separated along their parting surfaces. Such separation permits of the removal of given force sections from the associated stationary platen so that other force sections may be substituted for the first force sections, enabling articles of different configurations to be moulded without changing the stationary platen.

The movable platen 114 supports downwardly thereof a retainer plate 130 which supports downwardly thereof a plurality of cavity sections 132. In the use of the mould, these component parts are firmly clamped together so that the same constitute in effect, a unitary construction. However, the various components can be separated along their parting surfaces. Such separation permits of the removal of a given cavity section, or plurality thereof, from an associated retainer plate 130 so that other cavity sections may be substituted for the first cavity sections, enabling articles of different configurations to be moulded without changing the retainer plate 130.

Disposed below said stationary platen 110 in spaced relation therewith is the usual movable knockout or ejector plate (not shown) and carrying upwardly thereof and therewith an ejector retainer to which fixedly positioned in predetermined relationship to the retainer plate 110 and the force sections 120 a plurality of vertically extending ejector or knockout pins which register with suitable openings in the stationary platen 110 and in certain instances the forces 120.

Said pins are movable therein when the knockout or ejector plate is operated to eject the moulded articles and the sprues as will be observed.

Extending outwardly from the main sprue channel (not shown), a plurality of runner channels or side runner channels 58 are provided.

The outer end portions of the runner channels 158 farthest away from the main runner or sprue channel are curved so as to extend vertically upwardly and to taper inwardly to form gate openings such as 162.

That is, the gate opening is provided with an inclined interior bore which gradually converges upwardly. This bore is a passage for the moulding material and terminates in an annular shoulder formed by a wall section 121 of the force 120 which overlies the said gate, the shoulder being so shaped as to form a small pin-like vertically-extending passageway leading through the said wall section 121 directly into the article molding cavity.

The members 110 and 120 may be provided with vertically aligned bores 170 therein through which a plug or insert 172 may be disposed said plug containing at its upper end the features of the invention as shown.

The plug or insert 172 may be easily replaced within the mould components not to mention the ease with which the gate may be made when so designed.

The apparatus of the modification is so designed that the length of the narrow pin-like passageway provides an easily separable sprue. As the formed article is pushed upwardly by its respective ejector pin on one side of the passageway and as the gate and runner are pushed upwardly by its respective ejector pin on the other side of the passageway, the narrow pin like gate set within the opening is held in situ so that the aforementioned formed article and gate and runner are rotated or angularized relative thereto. This twisting action effects the desired separation of formed article and related sprue.

As aforedescribed, these passages normally diverge from a common pressure chamber outlet in a manner forming a multiplicity of individual passages, one of which leads to an end of each of the article-molding cavities.

In accordance with the provisions of the patent statutes, I have illustrated and described the principle of operation of my invention together with the apparatus which I now believe to represent the best and preferred embodiments thereof, but desire to have it understood that the apparatus illustrated and described is only exemplary and that numerous modifications and rearrangements may be made therein without departing from the essence of the invention.

Without further analysis, the foregoing is intended to so fully reveal the gist of my invention and its construction and operation that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are contemplated since the invention is susceptible of such without departing from its real spirit or underlying principles. Stated otherwise, it is not desired to limit this invention to the exact construction shown and described as the objects hereof may be attained by the use of constructions different in certain respects from that disclosed.

The invention is claimed, broadly as well as specifically, as indicated in the appended claims, and same are desired to include wtihin the scope thereof all of said suitable variations, modifications and equivalents by which substantially the results of the invention may be obtained through the use of substantially the same or equivalent devices or means. Accordingly, limitation hereof should only be made as determined by a proper interpretation of the subjoined claims.

The protection which is sought for this invention is covered by the language of the specification and the spirit represented thereby and same is limited only by the prior art and the scope of the appended claims.

What is claimed as new and useful is:

1. In a molding die construction, the combination of, a pair of mold members having cooperating confronting portions defining an article cavity of the shape of the article to be produced and a gate cavity for leading a supply of the plastic material through one of the mold members to the article cavity, the mold members of said pair being separable along a parting plane to permit release of the molded article and the molded gate from the respective said cavities, said article cavity and gate cavity being interconnected by a gate orifice of restricted dimension extending from said gate cavity through the wall of one of the mold members of said pair thereof to the parting plane adjacent said article cavity and providing a bridge circumadjacent the gate orifice at the parting plane, means operable in seriatim for holding together and separating the mold members of said pair thereof, and article ejecting means operable to cause ejection of the article from said article cavity and gate ejecting means operable to cause ejection of the gate cavity during separation of the mold members of said pair thereof for separating the molded article and molded gate at the juncture defined by the molded stem of solidified material in the gate orifice interconnecting therebetween by means of the bridge constituting the severing means.

2. A method of separating a sprue from a molded article during ejection of the molded article and sprue from the mold comprising, ejecting the molded article and sprue by fulcruming the molded article and sprue upwardly relative to each other and relative to a thin interconnecting gate in the form of a restricted reduced section of the sprue at one end thereof adjacent to and connected to the molded article by means of an article ejecting means operable to cause ejection of the article from the mold and a sprue ejecting means operable to cause ejection of the sprue from the mold.

3. A method of separating a sprue from a molded article during the simultaneous ejection of the sprue and molded article from the mold consisting in rotating both the sprue and the molded article about a bridge adjacent a connecting orifice of restricted dimension formed by the flared inwardly extending upper end of the sprue between the molded article cavity and the sprue cavity by means of an article ejecting means operable to cause projection of the molded article from the mold article cavity and a sprue ejecting means operable to cause projection of the sprue from the sprue cavity.

4. A method of separating a sprue from a molded article during ejection of the sprue and the molded article from the mold comprising fulcruming both the sprue and the molded article about a bridge circumadjacent a pin-like gate interconnecting the sprue and molded article by means of an article ejecting means operable to cause ejection of the molded article from the mold at one side of the bridge and a sprue ejecting means operable to cause ejection of the sprue from the mold at the opposite side of the bridge.

5. A method of separating a sprue from a molded article during ejection of the sprue and the molded article from their respective mold cavities comprising twisting the sprue and the molded article about an axis passing at right angles to the longitudinal and substantially parallel axes of the sprue and molded article through a pin-like gate interconnecting the sprue and molded article and formed by a bridge circumadjacent the orifice adopted to form the said pin like gate by means of an ejector extended into the mold cavity of the molded article and an ejector extended into the mold cavity of the sprue.

References Cited in the file of this patent

UNITED STATES PATENTS

| | | |
|---|---|---|
| 1,865,464 | Geyer | July 5, 1932 |
| 2,227,966 | Emsley | Jan. 7, 1941 |
| 2,330,369 | Marsh | Sept. 28, 1943 |
| 2,360,011 | Popp | Oct. 10, 1944 |
| 2,520,263 | Vinal | Aug. 29, 1950 |
| 2,587,070 | Spillman | Feb. 26, 1952 |
| 2,799,049 | Wilson | July 16, 1957 |
| 2,799,435 | Abplanalp | July 16, 1957 |